(12) United States Patent
Barlian et al.

(10) Patent No.: US 6,871,540 B2
(45) Date of Patent: Mar. 29, 2005

(54) METHOD AND DEVICE FOR DETERMINING QUANTITIES OF FLUID

(75) Inventors: Reinhold Barlian, Bad Mergentheim (DE); Alfred Boehm, Viechtach (DE)

(73) Assignee: Bartec GmbH, Bad Mergentheim (DE)

( * ) Notice: Subject to any disclaimer, the term of this patent is extended or adjusted under 35 U.S.C. 154(b) by 31 days.

(21) Appl. No.: 10/380,473

(22) PCT Filed: Sep. 19, 2001

(86) PCT No.: PCT/EP01/10840

§ 371 (c)(1),
(2), (4) Date: Sep. 8, 2003

(87) PCT Pub. No.: WO02/25226

PCT Pub. Date: Mar. 28, 2002

(65) Prior Publication Data

US 2004/0074310 A1 Apr. 22, 2004

(30) Foreign Application Priority Data

Sep. 21, 2000 (DE) .......................................... 100 46 921

(51) Int. Cl.$^7$ .............................................. G01F 23/56
(52) U.S. Cl. ....................................... 73/305; 73/290 R
(58) Field of Search ...................... 73/861, 305, 290 R, 73/309, 322, 323, 332, 302, 303

(56) References Cited

U.S. PATENT DOCUMENTS 5,922,969 A * 7/1999 Haar ........................ 73/861.02
6,538,261 B1 * 3/2003 McConnel et al. ......... 250/577

* cited by examiner

Primary Examiner—Edward Lefkowitz
Assistant Examiner—Corey D. Mack
(74) Attorney, Agent, or Firm—Jacobson Holman PLLC

(57) ABSTRACT

The invention relates to a method and device for determining the quantity of fluid discharged from a tank via a line system. To this end, the difference between the quantity of fluid contained inside the tank before fluid discharge and the quantity of fluid remaining inside the tank after fluid is discharged is calculated. In addition, a measuring device measures the quantity of fluid, which is contained inside the line system and which is taken into consideration when determining the discharged quantity of fluid.

22 Claims, 2 Drawing Sheets

METHOD AND DEVICE FOR DETERMINING QUANTITIES OF FLUID

This is a nationalization of PCT/EP01/10840 filed Sep. 19, 2001 and published in German.

The invention relates to a method for determining the quantity of fluid discharged from a tank, in particular from a fuel tank, via a line system, in which the difference between the quantity of fluid contained inside the tank before fluid discharge and the quantity of fluid remaining inside the tank after fluid discharge is calculated in order to determine the discharged quantity of fluid. Furthermore, the invention relates to a device for determining the quantity of fluid discharged from a tank, in particular from a fuel tank, via a line system, comprising an evaluation unit which calculates the difference between the quantity of fluid contained inside the tank before fluid discharge and the quantity of fluid remaining inside the tank after fluid discharge in order to determine the discharged quantity of fluid.

The aforementioned method and the aforementioned device are known and used especially in distributing vehicles for fuel oil, diesel, gasoline, super gasoline or also chemicals. In order to determine the quantity of fluid discharged from the tank via the line system a filling level measuring is frequently carried out in the inside of the tank and the discharged quantity of fluid is determined according to the filling levels measured before and after fluid discharge. Particularly when using this known method for fluids that are likely to pass over into the gas phase at low temperatures already, such as gasoline, diesel or similar substances of high volatility, there is the problem that the measuring device does not function properly any more when the tank is almost empty and that gas and air enter into the line system together with the fluid so that the quantity of fluid detected by the measuring device does not correspond to the total quantity of fluid that was actually discharged from the tank and the line system. However, because of statutory provisions laid down in particular for such substances the measuring fault occurring in the quantity of fluid to be discharged must not be higher than 0.5%.

To meet these statutory provisions EP 0 855 576 A1 proposes a method and an apparatus for measuring the volume of fluids flowing through, in which the proportion of gas bubbles present in the fluid is detected by means of a gas bubble sensor disposed in the line system. Moreover, seen in the flow direction of the fluid after the gas bubble sensor a ventilating tank is arranged that is connected to the tank by means of a return line. Furthermore, seen in the flow direction of the fluid the meter is arranged after the ventilating tank, by means of which the discharged quantity of fluid is determined. As soon as the gas bubble sensor detects a gas proportion in the fluid that is too high, the return line of the ventilating tank is opened so that the gas that has collected in the ventilating tank flows back into the tank and is not detected by mistake when the discharged quantity of fluid is determined by the meter.

From DE 197 33 715 C1 a method and an apparatus for discharging fluids from a tanker vehicle is known. In this method and respectively in this apparatus a gas bubble sensor as well as a pressure sensor is provided in the line system. The pressure sensor detects the geodetic pressure present in the line system which decreases upon a falling fluid level in the tank. From a particular pressure value on a pressure switch connected to the pressure sensor throttles the bottom valve of the tank, whereby the risk of gas mixtures being pulled along is to be reduced. A soon as the gas bubble sensor detects a gas proportion in the fluid that is too high, the discharge valve located at the end of the line system is closed and the fluid discharge is terminated. The rest of the fluid remaining inside the line system is emptied without the quantity of fluid being determined by the apparatus.

In these known methods and these known apparatuses there is the problem that due to the gas contained in the fluid of the discharged quantity of fluid a precise determination of the discharged quantity of fluid is prevented, particularly when the tank is almost empty.

U.S. Pat. No. 5,505,335 A discloses a conveying device for fluids, in which the weight of the tank is measured before and after fluid discharge in order to determine the discharged quantity of fluid. To prevent a misrepresentation of the measurement results the line system is pumped empty both during the weight measurement before fluid discharge and during the weight measurement after fluid discharge.

From DE 198 21 559 A1 a device for discharging measurable quantities of different sorts of fluids is known. The tanks filled with the different sorts of fluids are in flow connection via a line system with a common pipe. In the line of each tank, which is connected to the line system, a measuring device is each provided for measuring the quantity of fluid discharged from the tank. To ensure a correct calculation of the quantity of fluid to be discharged either the quantity of fluid discharged to refill the line system and the pipe is not calculated or the quantity of fluid contained inside the pipe is reconveyed into the tank upon completion of the fluid discharge, with the reconveyed quantity of fluid being detected and the difference to the discharged quantity of fluid being calculated.

The object of the invention is to provide a method and respectively a device for determining the quantity of fluid discharged from a tank via a line system, in which a precise determination of the totally discharged quantity of fluid is also possible when the tank is almost empty.

This object is solved by a method according to claim 1 and by a device according to claim 10.

The method according to the invention builds upon the prior art in that the quantity of fluid contained inside the line system is detected and that the quantity of fluid detected in the line system is taken into consideration when determining the discharged quantity of fluid. In the method according to the invention the quantity of fluid contained inside the line system is taken into consideration in order to determine the quantity of fluid discharged in total from the tank and the line system. Particularly in the line system gases collect during the fluid discharge, which prevent a precise determination of the discharged quantity of fluid when the tank is almost empty. Therefore, in the method according to the invention the quantity of fluid contained inside the line system is detected in addition to the detected quantity of fluid discharged from the tank and the former is offset against the quantity of fluid discharged from the tank for the precise determination of the discharged quantity of fluid. In this manner it is possible to carry out a precise determination of the discharged quantities of fluid despite the gases that are drawn into the line system during the fluid discharge and collect inside the line system without requiring for this a gas separator as it is used in the prior art.

By preference the quantity of fluid contained inside the line system is detected after the flow connection from the tank to the line system has been interrupted and after gas present inside the line system and the gauge tube has been discharged or vented.

In addition, it is proposed that when the discharged quantity of fluid is determined the difference between the quantity of fluid contained inside the line system before fluid discharge and the quantity of fluid remaining inside the line system after fluid discharge is calculated so as to ensure that fluid which was still contained inside the line system before fluid discharge is taken into consideration when determining the totally discharged quantity of fluid.

If at least one section of the line system is not filled with fluid before fluid discharge, it is proposed that the section of the line system is emptied upon completion of the fluid discharge so that after fluid discharge the quantity of fluid present in the section of the line system can be left unconsidered when determining the discharged quantity of fluid, whereby the determination of the discharged quantity of fluid is facilitated.

If however, after at least one section of the line system had not been filled with fluid prior to the fluid discharge, fluid is contained in the section after fluid discharge, it is proposed for a precise determination of the discharged quantity of fluid that the quantity of fluid contained in the section after fluid discharge is detected and deducted from the quantity of fluid discharged from the tank when determining the discharged quantity of fluid.

If at least one section of the line system is filled with fluid before fluid discharge, it is of advantage for a precise determination of the totally discharged quantity of fluid, if the quantity of fluid contained inside the section before fluid discharge is detected. When the section is empty after fluid discharge the quantity of fluid detected inside the section prior to the fluid discharge can be added to the quantity of fluid discharged from the tank when determining the discharged quantity of fluid.

In addition, it is proposed that in those cases, in which at least one section of the line system is filled with fluid both before and after fluid discharge, the totally discharged quantity of fluid is calculated in consideration of the quantity of fluid contained inside the section of the line system before and after fluid discharge. This method is of particular advantage if the fluid is to be discharged from the tank via so-called full pipes that are filled with fluid both before and after fluid discharge. In this case the quantity of fluid contained inside the section before fluid discharge is detected, after fluid discharge the quantity of fluid contained inside the at least partially filled section of the line system is detected and the difference to the quantity of fluid contained inside the section before fluid discharge is calculated when determining the totally discharged quantity of fluid.

In a preferred embodiment of the method the quantity of fluid contained inside the line system is only taken into consideration for determining the discharged quantity of fluid if the quantity of fluid contained inside the tank is smaller than or equal to a predetermined threshold value. If the quantity of fluid contained inside the tank is larger than the predetermined threshold value, it must be assumed that at the most small quantities of gas enter into the line system during the fluid discharge. Since the volume of the line system is known, the totally discharged quantity of fluid can be determined by calculating the difference between the quantity of fluid contained inside the tank before fluid discharge and the quantity of fluid remaining inside the tank after fluid discharge. If appropriate, the fluid contained inside the line system, whose quantity is predetermined due to the known volume of the line system, is also taken into consideration here, provided that the line system was empty or completely filled before fluid discharge and that after fluid discharge the line system was completely emptied or completely filled.

In the procedures described above, in which there still remains fluid inside the line system after fluid discharge, it is proposed that the quantity of fluid contained inside the line system upon completion of the fluid discharge is reconveyed into the tank, and when doing so the quantity of fluid that is reconveyed into the tank is not taken into consideration when determining the totally discharged quantity of fluid. The reconveying of remaining fluid from the line system into the tank is of particular advantage if the tank is divided into individual tank segments that are filled with different fluids so that during a subsequent fluid discharge the fluid to be discharged is not mixed with the remaining fluid present in the line system.

In a preferred embodiment of the method the quantity of fluid is detected by a measuring device provided in the line system. For this e.g. a gauge tube or also an ultrasonic measuring device is suitable. Alternatively, the use of a measuring device is proposed, wherein the quantity of fluid is determined by means of a potentiometric measuring method or by means of similar methods.

To determine the quantity of fluid discharged form the tank it is proposed that a measuring device is arranged inside the tank which detects the quantity of fluid discharged from the tank. For this e.g. a gauge stick is suitable, with which the fluid level in the tank is detected. Alternatively, it is also possible to provide a measuring device that is disposed outside the tank so as to detect for instance the fluid volume contained inside the tank, the level of the fluid or the like.

Particularly when using the method according to the invention in a non-stationary tank that is fixed onto tanker vehicles for example it is of advantage if the inclination of the tank and/or the inclination of the line system is detected during the fluid discharge. Afterwards, when determining the quantity of fluid actually discharged, the quantity of fluid that was determined theoretically beforehand is corrected according to the detected inclination.

If the tank is to be emptied completely via a discharge, the discharge is preferably connected with the line system and in order to detect the complete emptying of the tank the quantity of fluid contained inside the line system is detected continuously. In this way a complete emptying of the tank can be detected by means of the method according to the invention without requiring further sensors for this purpose.

Since both the volume of the fluid and its tendency for the formation of gas depend on the temperature of the fluid, it is also of advantage if a temperature compensation is carried out, in which the temperature of the fluid is measured first and afterwards, when determining the quantity of fluid that was actually discharged, the quantity of fluid that was theoretically determined beforehand is corrected according to the temperature of the fluid.

The device in accordance with the invention provides that a measuring device is provided in the line system for detecting the quantity of fluid contained inside the line system, which is connected to the evaluation unit, and that the evaluation unit is designed to take into consideration the quantity of fluid detected inside the line system when determining the discharged quantity of fluid. In the device according to the invention it is proposed that a measuring device is provided in the line system which serves to detect the quantity of fluid contained inside the line system so that gases contained inside the line system that would falsify the measuring result are not taken into consideration when determining the quantity of fluid actually discharged.

In order to be able to detect the quantity of fluid contained inside the line system in a precise manner it is proposed that a tank valve is provided between the tank and the line system so as to block the line system and that, seen in the flow direction of the fluid to be discharged, the measuring device is disposed after the tank valve in the line system. As soon as the fluid discharge is completed the tank valve is blocked and the fluid occluded inside the line system is detected quantitatively by the measuring device without the measuring of the quantity of fluid being influenced by any interfering factors that are caused by the fluid flow.

In a preferred embodiment of the device a pumping device is provided in the line system, by means of which the fluid is conveyed from the tank into the line system. In this embodiment the measuring device can be arranged preferably after but also before the pumping device in the line system when seen in the flow direction of the fluid to be discharged in order to ensure that the quantity of fluid conveyed from the tank, which collects inside the line system upon completion of the fluid discharge, is detected.

In another preferred embodiment of the device in accordance with the invention the line system is divided by a valve, preferably a check valve, into a first and a subsequent second section, the second section having a connection for full pipes. In this embodiment the measuring device is arranged in the first section.

A line system that is divided in such manner is employed particularly if so-called full pipes are used which are completely filled with fluid both before and after fluid discharge. By means of the valve it is ensured that the second section of the line system is always filled with fluid so that when a fluid discharge takes place by this second section the quantity of fluid contained in the second section does not have to be taken into consideration when determining the actually discharged quantity of fluid. As the measuring device is arranged in the first section, this line system can be used at the same time in those cases in which an additional determination of the quantity of fluid contained in the first section of the line system is required.

In a further development of this embodiment it is proposed that a connection for empty pipes, i.e. pipes that are completely empty both before and after fluid discharge, is designed in the first section of the line system.

In this embodiment, in which the line system is divided into two sections, it is furthermore of advantage if a stop valve is each provided near the pipe connection or near the pipe connections in the line system. By means of this stop valve the pipe connected to the pipe connection can be separated from the line system so that only the fluid contained inside the line system is detected in the quantitative measurement.

For the venting of the line system a vent line is usually provided, which can be blocked by a vent valve and is connected for example to the tank or to the adjoining area by means of suitable filter units. In a particularly preferred embodiment this vent line is connected to the measuring device provided on the line system so that the measuring device additionally serves the purpose of venting the line system.

By preference the measuring device has a measuring tube that is in flow connection with the line system. In this measuring tube the fluid can rise to such an extent in proportion to the fluid pressure exerted in the line system that a precise determination of the quantity of fluid contained inside the line system is rendered possible.

When the tank is in a zero-degree position the measuring tube extends at least approximately vertically in order to relate the detection of the quantity of fluid to a defined position of the tank.

In addition, it is proposed that the measuring tube is dimensioned in its length such that it projects in the vertical direction from the bottom of the tank when seen with respect to the bottom of the tank. This way an overlapping measuring portion is formed for the tank and the measuring tube so that when the fluid level in the tank is low and when the tank is inclined it is ensured that a precise detection of the quantity of fluid contained inside the line system is already possible with the measuring tube of the measuring device.

As measuring device a gauging device is preferably used, in which the measuring tube is designed as a gauge tube, wherein a gauge stick is accommodated for measuring the fluid level. The use of a gauging device as measuring device has the advantage that a very precise determination of the quantity of fluid inside the line system is possible with a comparatively simple construction.

In a preferred embodiment of the gauging device a float is slidably supported on the gauge stick, which floats on the fluid contained inside the gauge tube and whose position can be detected along the gauge stick. To determine the fluid level inside the line system the evaluation unit evaluates the position of the float.

In an alternative embodiment the measuring device has an ultrasonic measuring unit or a potentiometrically operating measuring unit, e.g. with gauge stick, which detects the fluid level inside the measuring tube. Measuring units of such kind are particularly suitable in those cases in which a measuring of the quantity of fluid inside the line system is to be carried out from the outside without any components of the measuring device being arranged inside the line system.

The fluid level in the tank is preferably detected by a further measuring device that is connected to the evaluation unit. In this case too a gauging device arranged inside the tank can be used as measuring device. Alternatively, it is also conceivable to use a measuring device that detects the fluid level in the tank from the outside.

To render a quickest possible emptying of the tank possible it is furthermore proposed that the line system is connected to the tank by means of a discharge connection. The discharge connection is for its part connected to the tank by means of a tank valve and can be blocked to the outside by means of a discharge valve. The discharge connection can be in direct flow connection with the line system. Alternatively, it is also possible to additionally provide a stop valve between the discharge connection and the line system, with which the flow connection of the discharge connection to the line system can be interrupted. This is useful for example when the inside of the tank is to be cleaned and when the cleaning fluid is discharged from the discharge connection without the line system being flowed through by the cleaning fluid.

Usually, the discharge connection can be used for the charging or filling of the tank as well as for the discharging through gravity.

In order to be able to also detect changes in volume that are possibly caused by the temperature of the fluid it is furthermore proposed that a temperature sensor is provided in the line system, which is connected to the evaluation unit and with which the temperature of the fluid contained inside the line system can be detected.

In addition, it is proposed that an inclination sensor is provided on the tank or on the line system, which is also connected to the evaluation unit and whose signal is used, in the case of an inclination of the tank and/or the line system, to correct the theoretically discharged quantity of fluid that was determined by the evaluation unit according to the detected angle of inclination.

The above-described device is preferably employed in tanker vehicles in order to be able to detect as precisely as possible how much fluid, for example how much gasoline, diesel or similar substances that are to be determined in a precise manner have been delivered.

In the following a detailed description of the invention will be given by way of three schematic embodiments with reference to the enclosed drawing, wherein.

Figure 1:
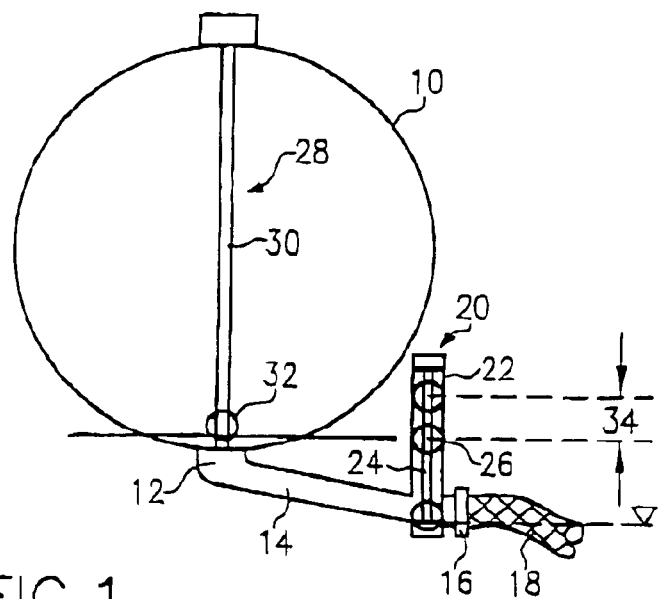
FIG. 1 shows a schematic side view of a first embodiment of a tank having a gauging device provided on the line system.

FIG. 1 shows a first embodiment of a fuel tank 10, in which the discharged quantity of fluid can be determined in the manner according to the invention. On its bottom the fuel tank 10 has a bottom valve 12, to which the end of a line 14 is connected that extends in an inclined fashion to the horizontal level. At the other end of the line 14 a connection coupling 16 is provided to which a pipe 18 is coupled. Near the connector coupling 16 a gauging device 20 is provided on the line 14 whose construction will be explained in the following.

The gauging device 20 has a gauge tube 22, which is in flow connection with the line 14 and is arranged near the connector coupling 16 and extends approximately vertically in its longitudinal direction if the fuel tank 10 is arranged approximately horizontally or at an angle of inclination of approximately zero degrees. In the gauge tube 22 a gauge stick 24 is arranged along which a float 26 is slidably supported. If there is fluid inside the gauge tube 22, the float 26 floats on the level of the fluid while an evaluation unit that is not depicted detects the position of the float 26. In FIG. 1 the float 26 is shown in a highest position, in an intermediate position and in a lowest position.

In the fuel tank 10 a further gauging device 28 is arranged which also has a gauge stick 30 that starts from the bottom valve 12 and extends vertically upwards through the fuel tank 10. Along the gauge stick 30 a second float 32 is slidably supported that floats on the fluid surface of the fuel contained inside the fuel tank 10 and whose position along the gauge stick 30 is likewise detected by the evaluation unit not depicted here.

As can furthermore be taken from FIG. 1 the gauge tube 22 of the gauging device 20 is dimensioned in its length such that, seen with respect to the bottom of the fuel tank 10, it projects from the latter in the upward and downward direction. In this way an overlapping measuring portion 34 is formed between the gauging device 20 and the further gauging device 28 so that when the fuel tank 10 is in an inclined position for instance both the gauging device 20 and the further gauging device 28 can indicate the fluid level in the fuel tank 10.

To detect the discharged quantity of fuel when the fuel tank 10 is full the evaluation unit first of all only detects the position of the second float 32 of the further gauging device 28. To this end the fluid level in the fuel tank 10 before fluid discharge is determined and stored. For the discharge of the fluid, e.g. of fuel, the bottom valve 12 is then opened and the fluid is drained from the fuel tank 10, with the fluid flowing through the line 14 into the pipe 18. After closing the bottom valve 12 the line 14 is opened for example by loosening the connector coupling 16 so that fluid which may still be present in the line 14 and in the pipe 18 can be drained through the pressure balance. Afterwards the evaluation unit determines once more the position of the second float 32 and detects the fluid level in the fuel tank 10. By means of volume data stored in the evaluation unit the quantity of fluid discharged from the fuel tank 10 can be determined from the difference of these two detected fluid levels.

In the event that the fuel tank 10 is almost empty so that the second float 32 of the further gauging device 28 is positioned on the level of the overlapping measuring portion 34 the evaluation unit additionally detects the fluid level in the fuel tank 10 by means of the gauging device 20. As soon as the second float 32 of the further measuring device 28 reaches this overlapping portion 34, the bottom valve 12 can be throttled by the evaluation unit so that at the most small quantities of gas and air are drawn into the line 14 by the fluid flowing inside. The moment the second float 32 touches down on the bottom of the fuel tank 10 and is no longer able to indicate properly the level of the fluid, the evaluation unit determines the quantity of fluid only by means of the gauging device 20. In this gases and air that are possibly contained in the fluid inside the line 14 rise in the gauge tube 22, whereby the float 26 is pressed downwards and indicates the quantity of fluid that is actually contained inside the line 14. At the upper end of the gauging device a vent line is usually provided, as described with respect to FIGS. 2 and 3, so that the precise fluid level is detected in the gauge tube 22.

By means of the method according to the invention and the device according to the invention it is possible to carry out a precise determination of the quantity of fuel that was actually discharged from the fuel tank 10 and the line 14 even when the fuel tank 10 is almost empty.

Figure 2:
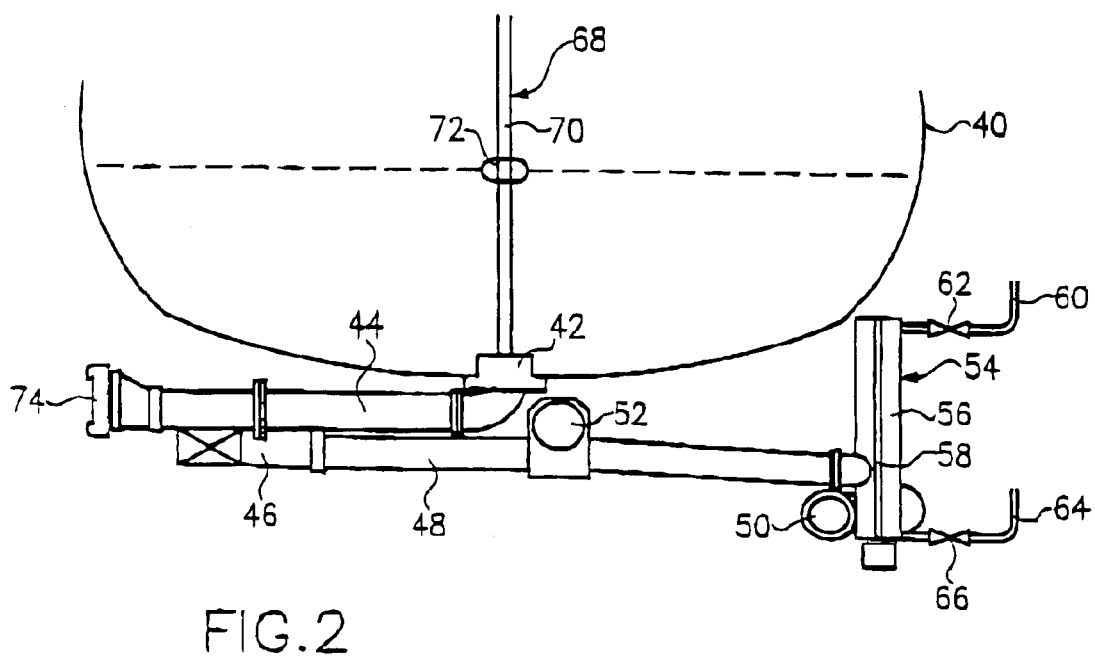
FIG. 2 shows a schematic side view of a second embodiment of a tank on a tanker vehicle, with a gauging device being provided on the line system of the tank.

FIG. 2 shows in a partially sectional schematic side view a second embodiment of a fuel tank 40 which is divided into individual tank segments. To each tank segment a tubing 44 extending on the underside of the fuel tank 40 is connected by means of a bottom valve 42 provided at the bottom of the tank segment. The individual tubings 44 of the different tank segments are in turn connected to a common collector line 46. The collector line 46 is for its part in flow connection with a tubing 48 at whose end that is turned away from the collector line 46 a connector coupling 50 for pipes is provided. Between the two tubes that form the tubing 48 a pump 52 is positioned which conveys the fluid from the fuel tank 40 and supplies it to the connector coupling 50. Near the connector coupling 50 a first gauging device 54 is provided on the tubing 48, which has a gauge tube 56 that is in flow connection with the tubing 48. As in the first embodiment described before, a gauge stick 58 with a float slidably supported thereon (not depicted) is arranged in the gauge tube 56. With the float the fluid level in the gauge tube 56 can be indicated which is determined by an evaluation unit that is not illustrated.

Furthermore, a vent line 60 is connected to the upper end of the gauge tube 56 that can be blocked by a vent valve 62. Near the underside of the gauge tube 56 a return line 64 is provided that is connected to the fuel tank 40 and can likewise be blocked by a stop valve 66.

In addition, in each tank segment of the fuel tank 40 a second gauging device 68 is provided which is designed in the same manner as the gauging device 28 described in the first embodiment and which can indicate the fluid level of the concerned tank segment of the fuel tank 40 by means of a float 72 that is slidably supported on a gauge stick 70. The position of the float 72 is likewise detected by the evaluation unit not depicted here.

If fluid is discharged or drained from the fuel tank 40, the fluid level in the concerned tank segment of the fuel tank 40 is detected first and then the bottom valve 42 is opened. At the same time the pump 52 is activated which conveys the fluid from the fuel tank 40 and supplies it through the connector coupling 50 into the pipe not depicted here.

In case the fluid level in the tank segment 40 drops to such an extent that the tank segment is almost empty, the evaluation unit additionally evaluates the position of the float of the first gauging device 54. At the same time the pumping capacity is throttled, if appropriate the bottom valve 42 is also throttled, so that a smaller quantity of gas and air is drawn into the tubing 44.

As soon as the second gauging device 68 in the fuel tank 40 is no longer able to indicate properly the fluid level in the fuel tank 40 the evaluation unit can detect from the position of the float of the first gauging device 54 how much fluid is still contained inside the tubing 48, in the collector line 46 and in the tubing 44. Gas that is possibly contained in the fluid and has collected in the gauge tube 56 of the gauging device 54 is removed via the vent line 60. The venting in the gauge tube 54 is carried out intermittently, in particular through an automatic opening of the vent valve 62. In particular, this is carried out when the float dropped below the highest level in the gauge tube 54. Moreover, the precise detection of the fluid level in the gauge tube 56 takes place with the pump 52 being idle.

In this manner it can be indicated precisely how much fluid is still contained inside the line system of the fuel tank 40 so that the evaluation unit is able to determine precisely the discharged quantity of fluid on the basis of the fluid level determined in the concerned tank segment of the fuel tank 40 prior to the fluid discharge, which was indicated by the second gauging device 68, and the fluid level remaining in the tank segment and the line system of the fuel tank 40 after fluid discharge.

If the connector coupling 50 is additionally provided with a valve not shown here, the vent valve 62 is opened immediately after opening the bottom valve 42 so as to let the gas and air contained inside the tubing 44 flow off through the vent line 60 for example into the fuel tank 40. As soon as the fluid in the gauge tube 56 of the first gauging device 54 reaches a specific upper threshold value, the vent valve 62 is closed.

In the case that there is still fluid contained inside the tubing 44, 46 and 48 after fluid discharge while the valve provided at the connector coupling is closed at the same time, the fluid can be reconveyed into the fuel tank 40 via the return line 64.

In order to be able to empty the respective tank segment of the fuel tank 40 completely a dry coupling 74 is additionally provided on the tubing 44 near the collector line 46, through which coupling the fluid can be drained from the tank segment, and in this the flow connection between the tubing 44 and the collector line 46 can be interrupted for example by a valve that is not illustrated. In addition, the inclination of the fuel tank 40 can be detected by means of an inclination sensor that is not shown so that when the positions of the floats of the two gauging devices 54 and 68 are being evaluated the evaluation unit can additionally consider the displacement of the fluid level resulting from the inclination. In addition, it is possible to detect the temperature of the fluid in the fuel tank 40 by means of a temperature sensor not shown here in order to also take into consideration changes in volume of the fluid caused by temperature when evaluating the discharged quantity of fluid.

Figure 3:
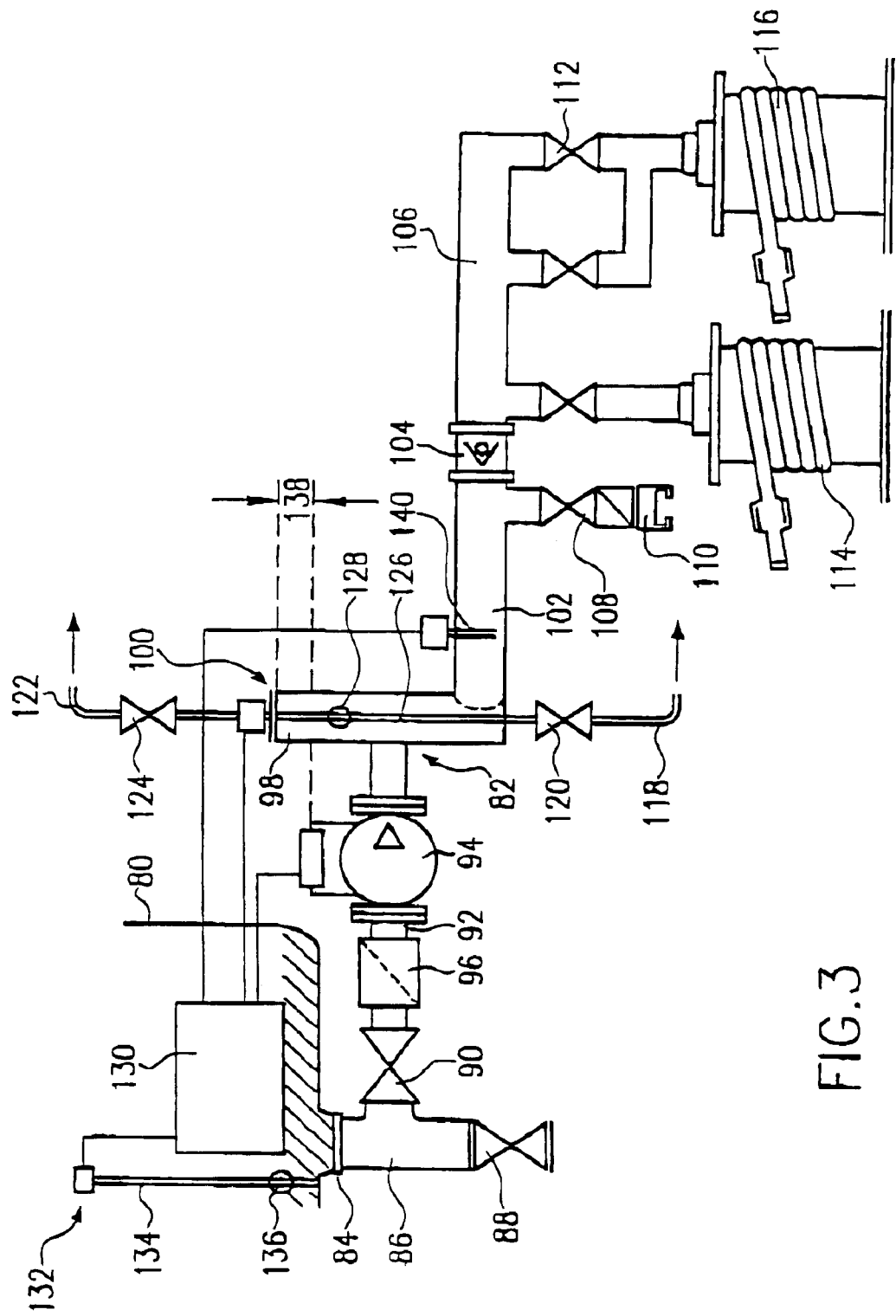
FIG. 3 shows a schematic side view of a third embodiment of a tank on a tanker vehicle, wherein the line system of the tank is divided and has a gauging device.

In FIG. 3 a partially sectional schematic side view of a third embodiment of a fuel tank 80 is shown, to the line system 82 of which so-called empty pipes and at the same time so-called full pipes can be connected, as will be explained hereinafter. On its bottom the fuel tank 80 also has a bottom valve 84 to which a discharge connection 86 is connected. The discharge connection 86 can be closed by a discharge valve 88. In addition, the discharge connection 86 has a branching to which a two-way valve 90 is connected. The two-way valve 90 is for its part connected to a tubing 92 into which a pump 94 and a filter 96 are inserted. The tubing 92 is connected to the gauge tube 98 of a gauging device 100. The gauging device 100 is part of the line system 82, wherein the gauge tube 98 passes over with its vertical lower end into a first line section 102. A second line section 106 is connected to the first line section 102 by means of a check valve 104.

The first line section 102 has a stop valve 108 to which a connector coupling 110 for an empty pipe (not shown) is attached. By empty pipe a pipe that is completely empty both before and after fluid discharge is understood in this context.

The second line section 106 is equipped with a total of three stop valves 112, with one of the stop valves 112 being in flow connection with a full pipe 114 while the other two stop valves 112 are in flow connection with a full pipe 116. By the term full pipe a pipe that is completely filled with fluid both before and after fluid discharge is understood in this context. To ensure this the second line section 106 is also completely filled with fluid, with the check valve 104 preventing a flow-back of the fluid from the second line section 106 into the first line section 102.

Furthermore, to the vertical lower end of the gauge tube 98 a return line 118 is connected that is in connection with the fuel tank 80 and can be interrupted by a return valve 120. To the vertical upper end of the gauge tube 98 a vent line 122 is connected that can also be in flow connection with the fuel tank 80 and can be interrupted by a vent valve 124.

In the gauge tube 98 of the gauging device 100 a gauge stick 126 is accommodated along which a float is slidably supported that floats on the fluid contained in the gauge tube 98 and transmits a corresponding signal to an evaluation unit 130.

Moreover, a second gauging device 132 accommodated in the fuel tank 80 is connected to the evaluation unit 130, which also has a gauge stick 134 along which a float 136 is slidably supported by means of which the fluid level in the fuel tank 80 can be indicated.

As in the first embodiment the gauge tube 98 is dimensioned in its length such that the first gauging device 100 forms an overlapping measuring portion 138 with the second gauging device 132.

Moreover, the evaluation unit 130 is connected to the control of the pump 94 and is in connection with a temperature sensor 140 which detects the fluid temperature in the first line section 102.

If fluid is to be conveyed from the fuel tank 80 through the empty pipe (not illustrated) coupled to the connector coupling 110, the first line section 102 is at first emptied via the return line 118 if this is required. Afterwards the bottom valve 84, the two-way valve 90 and the vent valve 124 are opened and the pump 94 is started.

The fluid now flows from the fuel tank 80 into the first line section 102, while the gauge tube 98 is being filled. When the float 128 of the first gauging device 100 has reached a maximum admissible position, in which the float 128 is positioned at the upper measuring limit of the measuring range 138 in the gauge tube 98, the vent valve 124 is closed. The gauging device 100 now indicates a maximum level while fluid flows at the same time from the fuel tank 80 into the empty pipe.

As soon as the second gauging device 132 detects a filling level in the fuel tank 80 that lies within the measuring range 138 the capacity of the pump 94 is throttled so as to prevent air and gas from being conveyed into the line system 82.

Since air and gas may have been conveyed into the line system 82 already, the float slightly drops in the gauge tube 98 of the gauging device 100, as a result of which it is indicated that air is contained inside the line system 82. Ventilation is effected by means of the vent valve 124 and the line 122.

If the float drops below a predetermined value in the gauge tube 98, the stop valve 108 of the first line section 102 is closed and the pump 94 is turned off.

From the filling level in the fuel tank 80 prior to the fluid discharge, the known volume of the line system 82 and the new filling level in the gauge tube 98 as well as measured values of inclination that have been detected where appropriate the actually discharged quantity of fluid can now be calculated precisely by the evaluation unit 130. The empty pipe not shown here is emptied by slightly loosening the screwing on the connector coupling 110 so that air can enter into the empty pipe.

If the respective tank segment is emptied completely including the line system 82, the pump is operated until the minimum level is being indicated by the gauge measuring in the gauge tube 98. In the case of a further discharge through gravity the float 128 can rest on the bottom of the gauge tube 98.

If fluid is to be discharged from the fuel tank 80 through the full pipes 114 and 116, the bottom valve 84 and the corresponding stop valve 112 area opened. Earlier on, the line system 82 was vented by means of the vent line 122 in the manner described above. At the same time the pump 94 that conveys the fluid into the line system 82 is being activated. As soon as the gauging device 100 detects that air and gas enter into the line system 82, the pumping capacity is reduced at first and then the two-way valve 90 and the stop valve 112 are closed to prevent gas and air from entering into the second line section 106.

From the fluid level determined by the second gauging device 132 before fluid discharge and from the fluid level indicated by the first gauging device 100 after fluid discharge, the currently discharged quantity of fluid can now be determined by the evaluation unit 130. Here inclination values of the fuel tank 80 which are additionally determined by an inclination sensor not depicted here can equally be taken into consideration as already set out before.

In these two methods of measurement described above it is also possible to detect the temperature of the fluid by means of the temperature sensor 140 so that a corresponding temperature compensation can be carried out by the evaluation unit 130 when determining the currently discharged quantity of fluid.

If the fuel tank 80 is to be emptied completely only the bottom valve 84 and the discharge valve 88 are opened. In doing so an empty level indicating sensor provided on the discharge connection 86 and not shown here responds as soon as the fluid is discharged completely from the fuel tank 80. In the case that the empty level indicating sensor shows a defect in function there is the possibility of opening the two-way valve 90 with the discharge valve 88 being closed at the same time. The fluid then flows into the line system 82 while the gauging device 110 is able to determine the precise quantity of fluid. Afterwards the fluid can be drained via the connector coupling 110.

The above-described embodiment can also be used with a fuel tank that is divided into individual tank segments, wherein for instance a different kind of fuel can be contained in each tank segment. In this case the line system 82 is connected to the individual tank segments via a collector line. In order to prevent a mixing of the different kinds of fuel the first line section 102 of the line system 82 can be emptied by means of the return line 118 before each new fluid discharge.

What is claimed is:

1. Method for determining a quantity of fluid discharged from a tank via a line system, said method comprising the steps of:

calculating a difference between a quantity of fluid contained inside the tank before fluid discharge and a quantity of fluid remaining inside the tank after fluid discharge to determine a discharged quantity of fluid, detecting a quantity of fluid contained inside the line system, taking into consideration the quantity of fluid contained inside the line system when determining the discharged quantity of fluid, detecting the quantity of fluid contained inside the line system by a gauging device, and carrying out the detection of the quantity of fluid inside the line system by the gauging device in an at least partially overlapping manner with the determination of the quantity of fluid inside the tank.

2. Method according to claim 1, wherein the quantity of fluid contained inside the line system is detected after a flow connection of the tank to the line system has been interrupted.

3. Method according to claim 1, wherein the difference between the quantity of fluid contained inside the line system before fluid discharge and the quantity of fluid remaining inside the line system after fluid discharge is calculated when determining the discharged quantity of fluid.

4. Method according to claim 1, wherein fluid-free sections of the line system are detected before and after fluid discharge and are taken into consideration when determining the quantity of fluid discharged in total from the tank and the line system.

5. Method according to claim 1, wherein when determining the discharged quantity of fluid, the quantity of fluid contained inside the line system is only taken into consideration if the quantity of fluid contained inside the tank is smaller than or equal to a predetermined threshold value.

6. Method according to claim 5, wherein the quantity of fluid contained inside the line system after completion of the fluid discharge is reconveyed into the tank.

7. Method according to claim 1, wherein one of an inclination of the tank and an inclination of the line system is detected during the fluid discharge and when determining the quantity of fluid actually discharged the quantity of fluid that was determined theoretically beforehand is corrected according to the detected inclination.

8. Method according to claim 1, wherein when the tank is completely emptied via a discharge the discharge is connected with the line system and the quantity of fluid contained inside the line system is detected continuously in order to detect the complete emptying of the tank.

9. Method according to claim 1, wherein a temperature of the fluid is detected and when determining the quantity of fluid actually discharged the quantity of fluid that was determined theoretically beforehand is corrected according to the temperature of the fluid.

10. Device for determining the quantity of fluid discharged from a tank via a line system, the device comprising
- an evaluation unit which calculates a difference between a quantity of fluid contained inside the tank before fluid discharge and a quantity of fluid remaining inside the tank after fluid discharge to determine the discharged quantity of fluid,
- a measuring device provided in the line system for detecting the quantity of fluid contained inside the line system, which is connected to the evaluation unit,
- the evaluation unit taking into consideration the quantity of fluid detected inside the line system when determining the discharged quantity of fluid,
- the measuring device being a gauging device for detecting the quantity of fluid contained inside the line system, and
- the gauging device being provided in the line system in an at least partially overlapping manner with the tank.

11. Device according to claim 10, wherein a tank valve is provided between the tank and the line system for blocking the line system and, seen in the flow direction of the fluid to be discharged, the gauging device is disposed after the tank valve in the line system.

12. Device according to claim 10, wherein a pumping device is provided in the line system and, seen in the flow direction of the fluid to be discharged, the gauging device is arranged one of after and before the pumping device in the line system.

13. Device according to claim 10, wherein the line system is divided by a valve into a first and a subsequent second section, the second section having a connection for full pipes, and the gauging device is arranged in the first section.

14. Device according to claim 13, wherein the first section has a pipe connection for empty pipes.

15. Device according to claim 14, wherein a stop valve is each provided in the line system near the pipe connection for empty pipes and respectively near the pipe connections for full pipes.

16. Device according to claim 10, wherein the gauging device has a measuring tube which is in flow connection with the line system.

17. Device according to claim 16, wherein when the tank is in a zero-degree position the measuring tube extends at least approximately vertically.

18. Device according to claim 16, wherein the measuring tube is dimensioned in its length such that, seen with respect to a bottom of the tank, the measuring tube projects in a vertical direction from the bottom of the tank.

19. Device according to claim 16, wherein the measuring tube is a gauge tube of the gauging device which has a gauge stick accommodated in the gauge tube for measuring the fluid level.

20. Device according to claim 10, wherein a further measuring device is provided by which the fluid level in the tank is detected and which is connected to the evaluation unit.

21. Device according to claim 10, wherein the line system is connected to the tank by a discharge connection, the discharge connection is connected to the tank by the tank valve, and
- the discharge connection is blocked to the outside by a discharge valve.

22. Device according to claim 21, wherein a stop valve is provided between the discharge connection and the line system for blocking the line system.

* * * * *